US007223475B2

(12) United States Patent
Kumar et al.

(10) Patent No.: US 7,223,475 B2
(45) Date of Patent: May 29, 2007

(54) COATED CONDUCTIVE CARRIERS

(75) Inventors: Samir Kumar, Penfield, NY (US); Thomas J. Budny, Penfield, NY (US); Brian S. Giannetto, Rochester, NY (US); Brian E. Moore, Ontario, NY (US); Scott M. Silence, Fairport, NY (US); Michael J. Duggan, Webster, NY (US); Bernard A. Kelly, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/658,874

(22) Filed: Sep. 10, 2003

(65) Prior Publication Data

US 2005/0064194 A1 Mar. 24, 2005

(51) Int. Cl.

| | |
|---|---|
| ***B32B 1/00*** | (2006.01) |
| ***B32B 15/02*** | (2006.01) |
| ***B32B 15/04*** | (2006.01) |
| ***B32B 27/00*** | (2006.01) |
| ***G03G 9/00*** | (2006.01) |

(52) U.S. Cl. ................... 428/407; 428/411.1; 428/421; 428/422; 428/457; 428/500; 428/522; 428/523; 430/111.1; 430/111.32; 430/111.35

(58) Field of Classification Search ................ 428/407, 428/411.1, 421, 422, 457, 500, 522, 523; 430/111.1, 111.32, 111.35

See application file for complete search history.

(56) References Cited

U.S. PATENT DOCUMENTS

| | | | | |
|---|---|---|---|---|
| 3,590,000 | A | 6/1971 | Palermiti et al. | 252/62.1 |
| 4,233,387 | A | 11/1980 | Mammino et al. | 430/137 |
| 4,935,326 | A | 6/1990 | Creatura et al. | 430/108 |
| 5,213,936 | A | 5/1993 | Creatura et al. | 430/124 |
| 5,496,675 | A | 3/1996 | Van Dusen et al. | |
| 5,998,076 | A | 12/1999 | Mahabadi et al. | 430/106.6 |
| 6,004,712 | A | 12/1999 | Barbetta et al. | 430/108 |
| 6,358,659 | B1 | 3/2002 | Foucher et al. | 430/111.35 |
| 6,391,509 | B1 | 5/2002 | Drappel et al. | 430/111.35 |
| 6,528,225 | B1 | 3/2003 | Mahabadi et al. | 430/111.33 |
| 6,764,617 | B1 * | 7/2004 | Viswanathan et al. | 252/500 |
| 2003/0022089 | A1 | 1/2003 | Veregin et al. | |

* cited by examiner

*Primary Examiner*—Ramsey Zacharia

(74) *Attorney, Agent, or Firm*—Eugene O. Palazzo; Fay Sharpe LLP

(57) ABSTRACT

Carrier comprised of a core, a polymer coating, and wherein said coating contains a conductive polypyrrole contained in a carbon black matrix; or a polyaniline contained in a carbon black matrix.

25 Claims, No Drawings

COATED CONDUCTIVE CARRIERS

RELATED PATENTS

Illustrated in U.S. Pat. No. 6,391,509, the disclosure of which is totally incorporated herein by reference, is, for example, a carrier comprised of a core, a polymer coating, and wherein the coating contains a conductive polymer.

Illustrated in U.S. Pat. Nos. 6,528,225 and 5,998,076, the disclosures of which are totally incorporated herein by reference, is, for example, a carrier comprised of a soft or hard magnetic core, a number of, or all of the pores thereof being filled with polymer, and thereover a coating and a carrier comprised of a porous hard magnetic core, and wherein the pores thereof are filled with a polymer, and which carrier contains a coating thereover of a polymer, or a polymer mixture. Also, illustrated in U.S. Pat. No. 6,004,712, the disclosure of which is totally incorporated herein by reference, are carriers, coated carriers, and developers thereof.

Also of interest is U.S. Pat. No. 6,358,659, the disclosure of which is totally incorporated herein by reference, where there is illustrated a carrier comprised of a core and thereover a polymer or mixture of polymers, and wherein the polymer can contain an inorganic polymer dispersed therein.

The appropriate components and processes of the above patents may be selected for the present invention in embodiments thereof.

BACKGROUND

This invention is generally directed to toner, carriers and developer compositions, and more specifically, the present invention relates to developer compositions containing carriers. In embodiments of the present invention, the carrier particles can be comprised of a core, a polymer, or mixture of polymer coatings thereover, and which coating or coatings have incorporated therein an intrinsically conductive polymer (ICP) additive of, for example, LIGO-PANI® available from GeoTech Chemical Company, or EEONOMER® available from Eeonyx Corporation. The LIGO-PANI® is believed to be an ICP comprised of polyaniline segments or chains attached and grafted to Lignin; and the EEONOMER® is believed to be comprised of an ICP of a polypyrrole or a polyaniline polymer deposited on a carbon black matrix, and which depositing is accomplished, for example, by an in situ polymerization. In embodiments, the conductivity of the ICP is, for example, from about 10 to about 50, and more specifically, from about 10 to about 40 Siemens/cm measured, for example, utilizing a pressed pellet per ASTM F84 and D257. The particle size median diameter of the carrier additive coating, such as the ICP, is, for example, equal to or less than about 100 nanometers, such as from about 25 to about 75 nanometers, or more specifically, a particle size distribution wherein 99 percent of the particles are of a diameter of below about 100 nanometers, that is for example about 1 percent of the particles are as large as 300 nanometers. The carriers of the present invention may be mixed with a toner of resin, colorant, and optional toner additives to provide developers that can be selected for the development of images in electrostatographic, especially xerographic, imaging systems, printing processes and digital systems.

Advantages of the carriers of the present invention in embodiments include, for example, the selection of certain inherently conductive polymers as carrier coating additives wherein the electrical conductivity thereof can be tailored to encompass the range from insulators to semiconductors to metals, and wherein the conductivity can increase linearly with the amount of conductive polymer present; substantial carrier thermal stability, for example, up to 300° C.; tunability of the carrier conductivity without substantially adversely affecting the carrier and developer triboelectric charge; eliminating or minimizing the known black mottle disadvantages related to developer conductivity differences between various carriers; utilization of low amounts of the polymeric ICP additive to achieve the same or similar conductivity as compared to higher amounts of, for example, a conductive carbon black; wear resistant carrier coatings thereby avoiding or minimizing color contamination in machine housings; compatibility with polymer coatings, such as polymethylmethacrylates (PMMA); excellent and stable high triboelectrical carrier and developer characteristics; the generation of economical carriers and developers; utilization of the carriers and developers in hybrid scavengeless systems wherein the conductivity increases without a corresponding triboelectric charge decrease; and the like. Compatibility of the conductive polymer with the host polymer coating is believed to be excellent as compared to, for example, blends of inorganic fillers or conductive additives, and this advantage can be achieved with the present invention in embodiments, it is believed, because of the partial miscibility of the conductive polymeric component and the nonconductive polymer hosts, which serve to eliminate or minimize the sharp interface between the host polymer and the inorganic filler, which is typically the point of weakest mechanical integrity in the composite, and is the point where the material fractures on the surface of a carrier in a xerographic environment.

The carriers and developers of the present invention can be selected for a number of different known imaging and printing processes including, for example, multicopy/fax devices, electrophotographic imaging processes, especially xerographic imaging, and printing processes wherein negatively charged or positively charged images are rendered visible with toner compositions of an appropriate charge polarity. Moreover, the carriers and developers of the present invention in embodiments can be selected for color xerographic imaging applications where several color printings can be achieved in a single pass.

REFERENCES

Developer compositions with coated carriers that contain conductive components like carbon black are known. Disadvantages associated with these prior art carriers may be that the carbon black can increase the brittleness of the polymer matrix, which causes the separation of the coating from the core, and thereby contaminates the toner and developer causing, for example, instabilities in the charging level of the developer as a function of factors, such as developer aging in a xerographic housing and the average toner area coverage of a printed page, or instabilities in the color gamut of the developer set. In addition, with carbon black it is difficult to tune, or preselect the carrier conductivity. These and other disadvantages are avoided, or minimized with the carriers of the present invention in embodiments thereof.

The conductivity of carbon blacks is generally independent of the type of carbon black used, and in composites there is usually formed a filamentary network above a certain concentration referred to as the "percolation" threshold. At concentrations of up to about 30 weight percent, conductivities of $10^{-2}$ (ohm-cm)$^{-1}$ have been reported. The resistivity thereof, measured with a standard 4 pin method, according to ASTM-257, is observed to increase with decreasing carbon black concentration.

Carrier particles for use in the development of electrostatic latent images are illustrated in many patents including, for example, U.S. Pat. No. 3,590,000. These carrier particles may contain various cores, including steel, with a coating thereover of fluoropolymers, or terpolymers of styrene, methacrylate, and silane compounds. Efforts have focused on the attainment of coatings for carrier particles, for the purpose of improving development quality; and also to permit carrier particles that can be recycled, and which do not adversely effect the imaging member in any substantial manner. Some of the present commercial coatings can deteriorate, especially when selected for a continuous xerographic process where the entire coating may separate from the carrier core in the form of chips or flakes, and fail upon impact, or abrasive contact with machine parts and other carrier particles. These flakes or chips, which are not generally reclaimed from the developer mixture, have an adverse effect on the triboelectric charging characteristics of the carrier particles thereby providing images with lower resolution in comparison to those compositions wherein entire carrier coatings are retained on the surface of the core substrate. Further, another problem encountered with some prior art carrier coatings resides in fluctuating triboelectric charging characteristics, particularly with changes in relative humidity. The aforementioned modification in triboelectric charging characteristics provides developed images of lower quality, and with background deposits.

There are illustrated in U.S. Pat. No. 4,233,387, the disclosure of which is totally incorporated herein by reference, coated carrier components for electrostatographic developer mixtures comprised of finely divided toner particles clinging to the surface of the carrier particles. Specifically, there is disclosed in this patent coated carrier particles obtained by mixing carrier core particles of an average diameter of from between about 30 microns to about 1,000 microns, with from about 0.05 percent to about 3 percent by weight, based on the weight of the coated carrier particles, of thermoplastic resin particles. The resulting mixture is then dry blended until the thermoplastic resin particles adhere to the carrier core by mechanical impaction, and/or electrostatic attraction. Thereafter, the mixture is heated to a temperature of from about 320° F. to about 650° F. for a period of 20 minutes to about 120 minutes enabling the thermoplastic resin particles to melt and fuse on the carrier core. While the developer and carrier particles prepared in accordance with the process of this patent are suitable for their intended purposes, the conductivity values of the resulting particles are not believed to be constant in all instances, for example, when a change in carrier coating weight is accomplished to achieve a modification of the triboelectric charging characteristics; and further with regard to the '387 patent, in many situations carrier and developer mixtures with only specific triboelectric charging values can be generated when certain conductivity values or characteristics are contemplated. With the invention of the present application, in embodiments thereof the conductivity of the resulting carrier particles are in embodiments substantially constant, and moreover, the triboelectric values can be selected to vary significantly, for example from less than about 80 microcoulombs per gram to greater than about −80 microcoulombs per gram, depending on the polymer mixture selected for affecting the coating processes.

With further reference to the prior art, carriers obtained by applying insulating resinous coatings to porous metallic carrier cores using solution coating techniques are undesirable from a number of viewpoints. For example, insufficient carrier coating material may be present, and therefore, is not as readily available for triboelectric charging when the coated carrier particles are mixed with finely divided toner particles. Attempts to resolve this problem by increasing the carrier coating weights, for example, to 3 percent or greater to provide a more effective triboelectric coating to the carrier particles necessarily involves handling excessive quantities of solvents, and further usually these processes result in low product yields. Also, solution coated carrier particles when combined and mixed with finely divided toner particles provide in some instances triboelectric charging values which are low for many uses. Powder coating processes have been utilized to overcome these disadvantages, and further to enable developer mixtures that are capable of generating high and useful triboelectric charging values with finely divided toner particles; and also wherein the carrier particles are of substantially constant conductivity. Further, when resin coated carrier particles are prepared by the powder coating process, the majority of the coating materials are fused to the carrier surface thereby reducing the number of toner impaction sites on the carrier material.

Powder coating processes typically select polymers in the form of fine powders which can be mixed with a carrier core. The triboelectric charging value of the aforementioned carriers can be controlled by the polymer or mixture of polymers selected for the coating, however, only a limited number of polymers are available in the form of fine powders, especially for the preparation of conductive carriers. Conductive polymers, which are in the form of fine powder, can be utilized as carrier coatings, for example a conductive carbon black loaded polymer, reference U.S. Pat. No. 5,236,629, the disclosure of which is totally incorporated herein by reference. Also, the carrier coating in some instances tend to chip or flake off, and fail upon impact, or abrasive contact with machine parts and other carrier particles. These flakes or chips, which cannot usually be readily reclaimed from the developer mixture, have an adverse effect on the triboelectric charging characteristics of the carrier particles, thereby providing images with lower resolution in comparison to those compositions wherein the carrier coatings are retained on the surface of the core substrate. Furthermore, partially coated carriers have a short life, for example from about 1 to about 30 days, and poor stability.

Other patents of interest include U.S. Pat. No. 3,939,086, which illustrates steel carrier beads with polyethylene coatings, see column 6; U.S. Pat. No. 4,264,697, which discloses dry coating and fusing processes; U.S. Pat. Nos. 3,533,835; 3,658,500; 3,798,167; 3,918,968; 3,922,382; 4,238,558; 4,310,611; 4,397,935; 5,015,550; 5,002,846; 4,937,166, 4,434,220, 5,424,160, and Japanese Patent 6273981.

Certain ferrite carriers are illustrated in U.S. Pat. Nos. 4,546,060; 4,764,445; 4,855,205, and 4,855,206. In the U.S. Pat. No. 4,855,205 patent there is disclosed a two phase ferrite composite with a spinel or S phase of the formula $MFe_2O_4$ and a magnetoplumbite or M phase, and which composite and magnetized. It is indicated in column 3 of this patent that the composites can be prepared by conventional procedures, and that the composite can be coated with a polymer well known in the art. Examples of polymers include those as illustrated in U.S. Pat. No. 4,546,060, such as fluorocarbon polymers like polytetrafluoroethylene, polyvinylidenefluoride, and the like, see column 8.

The disclosures of each of the above patents are totally incorporated herein by reference. The appropriate carrier cores and polymer coatings of these patents may be selected for the present invention in embodiments thereof.

SUMMARY

It is a feature of the present invention to provide toner and developer compositions with many of the advantages illustrated herein, and wherein the carriers may contain a polymer, or polymer mixture coating and an ICP component.

In yet another feature of the present invention there are provided carrier particles with substantially preselected constant conductivity parameters, and a wide range of preselected triboelectric charging values.

In yet a further feature of the present invention there are provided conductive carrier particles comprised of a coating generated from a mixture of monomers that, for example, are not in close proximity in the triboelectric series, that is for example, a mixture of monomers from different positions in the triboelectric series, and wherein the resulting coating has incorporated therein, or present therein or thereon an ICP (intrinsically conductive polymer).

In still a further feature of the present invention there are provided carrier particles with conductive components and with improved mechanical characteristics; carriers wherein the conductivity thereof is tunable by, for example, adjusting the concentration or amount of conductive polymer selected; and carriers wherein the coating adheres to the core, and wherein there is minimal or no separation of the polymer coating from the core.

In yet another feature of the present invention there are provided conductive carrier particles comprised of a metallic or metal oxide core, and which carrier may contain a complete coating thereover generated from a mixture of ICP polymers.

Further, in an additional feature of the present invention there are provided carrier particles with a coating thereover generated from a mixture of polymers, and wherein the carrier triboelectric charging values are from about −80 to about 80 microcoulombs per gram at the same coating weight as determined by the known Faraday Cage process.

Also, in another feature of the present invention there are provided positively charged toner compositions, or negatively charged toner compositions having incorporated therein metal or metal oxide carrier particles with a coating thereover of a polymer, a mixture of polymer coatings thereover, and preferably a mixture of two polymers and which polymers contain an ICP polymer.

Aspects of the present invention relate to a carrier comprised of a core, a polymer coating, and wherein the coating contains a conductive polypyrrole contained in a carbon black matrix, or a polyaniline contained in a carbon black matrix; a process for the preparation of carrier particles comprised of mixing carrier core, a coating polymer with polypyrrole doped carbon black particles thereby resulting in a polymer contained on the carrier core, and the polypyrrole doped carbon black particles present in the carrier polymer coating; carrier comprised of a core, a polymer coating, and wherein the coating contains a mixture of a polypyrrole and carbon black particles; carrier comprised of a core, a polymer coating, and wherein the coating contains a mixture of a polyaniline and carbon black particles; carrier comprised of a core, a polymer coating, and wherein the coating contains a conductive polymer; a carrier wherein the polymer coating is comprised of a mixture of polymers; a carrier wherein the polymer coating is comprised of a mixture of a polymer and conductive polymer additive; a carrier wherein the mixture is comprised of 3 polymers; a carrier wherein the mixture is comprised of polymers not in close proximity in the triboelectric series; a carrier wherein the mixture is comprised of from about 2 polymers to about 5 polymers; a carrier wherein the ICP polymer is present in an amount of from about 0.1 to about 5 percent by weight based on the weight percent of the polymer coating and the conductive polymer; a carrier wherein the conductive polymer is present in an amount of from about 0.1 percent by weight to about 20 percent by weight, or from about 1 percent by weight to about 10 percent by weight; a carrier wherein the carrier core diameter is from about 30 to about 100 microns; a carrier wherein the core is iron, steel or a ferrite; a carrier wherein the coating polymer is a styrene polymer; a carrier wherein the polymer coating is polyvinylidenefluoride, polyethylene, polymethyl methacrylate, polytrifluoroethylmethacrylate, copolyethylene vinylacetate, copolyvinylidenefluoride, tetrafluoroethylene, polystyrene, tetrafluoro ethylene, polyvinyl chloride, polyvinyl acetate, or mixtures thereof; a carrier wherein the polymer coating is polymethyl methacrylate, polystyrene, polytrifluoroethyl methacrylate, or mixtures thereof; a carrier wherein the polymer coating is comprised of a mixture of polymethyl methacrylate and polytrifluoroethyl methacrylate; a carrier wherein the polymer coating is present in a total amount of from about 0.2 to about 10 percent by weight of the carrier, or from about 1 to about 5 percent by weight of the carrier; a carrier with a conductivity of from about $10^{-15}$ to about $10^{-4}$ (ohm-cm)$^{-1}$; a carrier with a triboelectric charge value of from about −60 to about 60 microcoulombs/gram and a conductivity of from about $10^{-12}$ to about $10^{-4}$ (ohm-cm)$^{-1}$; a process for the preparation of carrier comprised of mixing a carrier core with a mixture of monomers, and an ICP, polymerizing the monomer by heating thereby resulting in a polymer contained on the carrier core and conductive polymer present in the carrier polymer coating; a process wherein the mixture is heated at a temperature of from about 50° C. to about 95° C., or from about 60° C. to about 85° C., optionally for a period of from about 30 minutes to about 5 hours, or from about 30 minutes to about 3 hours; a process wherein the monomer utilized is selected from the group consisting of styrene, α-methyl styrene, p-chlorostyrene, monocarboxylic acids and derivatives thereof; dicarboxylic acids with a double bond and derivatives thereof; vinyl ketones, vinyl naphthalene, unsaturated mono-olefins, vinylidene halides, N-vinyl compounds, fluorinated vinyl compounds, and mixtures thereof; and wherein the monomer is optionally present in an amount of from about 0.5 to about 10 percent by weight, or from about 1 to about 5 percent by weight of the carrier core; a process wherein the carrier coating monomer is selected from the group consisting of acrylic acid, methyl acrylate, ethyl acrylate, n-butyl acrylate, isobutyl acrylate, dodecyl acrylate, n-octyl acrylate, 2-chloroethyl acrylate, phenyl acrylate, methylalpha chloroacrylate, methacrylic acids, methyl methacrylate, ethyl methacrylate, butyl methacrylate, octyl methacrylate, acrylonitrile, methacrylonitrile and acrylamide; maleic acid, monobutyl maleate, dibutyl maleate, vinyl chloride, vinyl bromide, vinyl fluoride, vinyl acetate and vinyl benzoate; vinylidene chloride, pentafluoro styrene, allyl pentafluorobenzene, N-vinyl pyrrole, and trifluoroethyl methacrylate; and mixtures thereof, and wherein the monomer is present in an amount of from about 1 to about 7 percent by weight of the carrier core, or wherein the monomer is methyl methacrylate, styrene, trifluoroethyl methacrylate, or mixtures thereof, and wherein the monomer is present in an amount of from 0.5 to about 4 percent by weight, or from about 1 to about 5 percent by weight of the carrier core, and where the amount of the conductive polymer additive present is from about 1 to about 10 percent by weight; a developer comprised of the carrier illustrated herein and toner; a carrier wherein the polymer coating is an organosiloxane or an organosilane; a developer wherein the toner is comprised of a thermoplastic resin, colorant and known toner additives, such as charge additives, waxes, silicas, and the like, and wherein the coated carrier diameter is from about 30 to about 100 microns as measured by a Malvern laser diffractometer; a conductive coated carrier wherein the core is iron, steel or a ferrite, such as an iron ferrite, strontium ferrite, and the like; a conductive carrier wherein the coating contains a conductive polymer (ICP), and a second polymer of, for example, a vinyl polymer or a condensation polymer; a conductive carrier wherein the second polymer coating is a polystyrene, polyvinylidenefluoride, polyethylene, polymethylmethacrylate, polytrifluoroethylmethacrylate, copolyethylene vinylacetate, copolyvinylidenefluoride, tetrafluoroethylene, polystyrene, tetrafluoroethylene, polyvinyl chloride, polyvinyl acetate, polyvinyl acetate, or mixtures thereof, for example from about 1 to about 99 parts of a first coating and from about 99 to about 1 of a second coating, and wherein the total thereof is about 100 percent, or mixtures thereof, and wherein the polymer coating is present in a amount of from about 0.5 to about 99 percent by weight of the carrier; a carrier with a triboelectric charge value of from about −80 to about 80 microcoulombs/gram; a carrier with a conductivity of from about $10^{-17}$ to about $10^{-4}$ mho/cm; a carrier with a triboelectric charge value of from about −60 to about 60 microcoulombs/gram and a conductivity of from about $10^{-15}$ to about $10^{-6}$ mho/cm; and a developer composition comprised of conductive carrier particles with a polymer carbon black mixture coating and toner.

The carrier polymer coating, or polymer coating mixture can contain a conductive polymer (ICP) as illustrated herein, and which conductive polymer is commercially available, it is believed, including, for example, EEONOMER® which may be formed by the in situ polymerization of a polypyrrole onto a carbon black surface. The polymerization involves a catalyzed, oxidative polymerization of pyrrole onto carbon black. The amount of carbon which can be mixed into the suspension is usually experimentally determined and is typically from about 60 to about 90 percent, and which carbon black is as illustrated herein, a number of which can be obtained from Akzo Nobel Company as Ketzenblack. The heat produced in the reaction is controlled so the maximum carbon loading will often be reduced to conform to the temperature limits selected for the particular reaction. The amount of polymer like a pyrrole is, for example, about 10 to about 40 percent.

The following table illustrates examples of approximate weights of doped polymer as a percent of final product as determined by yield analysis.

| EEONOMER ® TYPE | APPROXIMATE WEIGHT PERCENT OF DOPED POLYMER ON CARBON BLACK |
|---|---|
| 100F | 11.5 |
| 200F | 18.5 |
| 250F | 24.25 |
| 300F | 30 |
| 350F | 40 |

Examples of properties of EEONOMER® 200F are:

EEONOMER ® 200F
Intrinsically Conductive Polypyrrole-Based Additive

| APPEARANCE | BLACK POWDER | |
|---|---|---|
| Bulk Conductivity | 26 to 32 S/cm | Pressed Pellet per ASTM F84 & D257 |
| Surface Resistivity | 0.5 to 3 ohm/sq. | Pressed Pellet per ASTM F84 & D257 |
| Surface Area (BET - $N_2$) | 570 $m^2/g$ | ASTM D 3037 |
| Particle Size* | Avg. 40 nm | TEM (JEOL 2000FX) |
| Sieve Residue | >90 percent >= 600 mesh | Laser Diffraction in Water |
| Water Content** | Avg. 0.1 percent | ASTM D 1509 |
| Ash Content | 0.01–0.04 percent | ASTM D 1506 |
| Temperature Limits | Process up to at least 290° C. (560° F.) | |
| Solubility | Not Soluble | |
| Chemical Nature | Neutral - Not Chemical Reactive | |
| Apparent Density | 0.03 $g/cm^3$ | |

Carriers with intrinsically conductive polymer additives based on polypyrrole and polyaniline, and available as EEONOMER® from Eeonyx Inc. are comprised of intrinsically conductive polypyrrole or polyaniline polymers deposited into carbon black matrix by an in situ polymerization. These carbon black/ICP composites are, for example, comprised of fine powders with a primary particle size of about 25 to about 100, from about 25 to about 75 nanometers, or with 99 percent of particles less than about 300 nanometers in diameter, and which carriers are thermally stable up to about 300° C. allowing them to be melt processed with a variety of resins used for powder coating applications, such as polyvinylidenefluoride, polyethylene, polymethylmethacrylate, polytrifluoroethylmethacrylate, copolyethylene vinylacetate, copolyvinylidenefluoride, tetrafluoroethylene, polystyrene, tetrafluoroethylene, polyvinyl chloride, polyvinyl acetate, polyvinyl acetate, or mixtures thereof.

The percentage of each polymer present in the carrier coating mixture can vary depending on the specific components selected, the coating weight and the properties desired. Generally, the coated polymer mixtures contain from about 10 to about 90 percent of a first polymer, and from about 90 to about 10 percent by weight of a second polymer. Preferably, there are selected mixtures of polymers with from about 40 to about 60 percent by weight of a first polymer, and from about 60 to about 40 percent by weight of a second polymer, and wherein the ratio of ICP to polymer coating like PMMA is from about 2/98 to about 20/80 and preferably from about 5/95 to about 10/90.

Various suitable solid core carrier materials can be selected, inclusive of known porous cores. Characteristic core properties include those that will enable the toner particles to acquire a positive or a negative charge, and carrier cores that will permit desirable flow properties in the developer reservoir present in the xerographic imaging apparatus. Also of value with regard to the carrier core properties are, for example, suitable soft magnetic characteristics that permit magnetic brush formation in magnetic brush development processes, and wherein the carrier cores possess desirable aging characteristics. Soft magnetic refers, for example, to a developer that develops an induced magnetic field only when exposed to an external magnetic field, and which field is immediately diminished when the external field is removed. Examples of carrier cores that can be selected include iron, iron alloys, steel, ferrites, magnetites, nickel, and mixtures thereof. Alloys of iron include iron-silicon, iron-aluminum-silicon, iron-nickel, iron-cobalt, and mixtures thereof. Ferrites include a class of magnetic oxides that contain iron as the major metallic component, and optionally a second metallic component including magnesium, manganese, cobalt, nickel, zinc, copper, and mixtures thereof. Preferred carrier cores include ferrites containing iron, nickel, zinc, copper, manganese, and mixtures thereof, and sponge iron with a volume average diameter of from about 30 to about 100 microns, and preferably from about 30 to about 90 microns as measured by a Malvern laser diffractometer. Examples of monomers or comonomers which can be polymerized to form a polymer coating on the carrier surface in an amount of, for example, from about 0.2 to about 10 percent, and preferably from about 1 to about 5 percent by weight of carrier core include vinyl monomers such as styrene, p-chlorostyrene, vinyl naphthalene and the like; monocarboxylic acids and their derivatives such as acrylic acid, methyl acrylate, ethyl acrylate, n-butyl acrylate, isobutyl acrylate, dodecyl acrylate, n-octyl acrylate, 2-chloroethyl acrylate, phenyl acrylate, methylalphachloroacrylate, methacrylic acids, methyl methacrylate, ethyl methacrylate, butyl methacrylate, octyl methacrylate, acrylonitrile, methacrylonitrile, acrylamide and trifluoroethyl methacrylate; dicarboxylic acids having a double bond and their derivative such as maleic acid, monobutyl maleate, dibutyl maleate, unsaturated monoolefins such as ethylene, propylene, butylene and isobutylene; vinyl halides such as vinyl chloride, vinyl bromide, vinyl fluoride; vinyl esters such as vinyl acetate, vinyl propionate, vinyl benzoate and vinyl butyrate; vinyl ethers, inclusive of vinyl methyl ether, vinyl isobutyl ether and vinyl ethyl ether; vinyl ketones inclusive of vinyl methyl ketone, vinyl hexyl ketone and methyl isopropenyl ketone; vinylidene halides such as vinylidene chloride and vinylidene chlorofluoride; N-vinyl compounds such as N-vinyl indole and N-vinyl pyrrolidene; fluorinated monomers such as pentafluorostyrene, allyl pentafluorobenzene and the like, other suitable known monomers, and mixtures thereof.

Carrier coating weights can vary, and are, for example, from about 0.1 to about 7, and more specifically, from about 0.2 to about 3, and yet more specifically, from about 0.8 to about 1.4 weight percent.

Toners can be admixed with the carrier to generate developers. As one toner resin there can be selected the esterification products of a dicarboxylic acid and a diol comprising a diphenol, reference U.S. Pat. No. 3,590,000, the disclosure of which is totally incorporated herein by reference, reactive extruded polyesters, such as those illustrated in U.S. Pat. No. 5,227,460, the disclosure of which is totally incorporated herein by reference, and the like. Preferred toner resins include styrene/methacrylate copolymers; styrene/butadiene copolymers; polyester resins obtained from the reaction of bisphenol A and propylene oxide; and branched polyester resins resulting from the reaction of dimethylterephthalate, 1,3-butanediol, 1,2-propanediol and pentaerythritol. Other toner resins are illustrated in a number of U.S. patents including some of the patents recited hereinbefore.

Generally, from about 1 part to about 5 parts by weight of toner are mixed with from about 10 to about 300 parts by weight of the carrier particles.

Numerous well known suitable colorants, such as pigments or dyes, can be selected as the colorant for the toner including, for example, cyan, magenta, yellow, red, blue, carbon black, nigrosine dye, lamp black, iron oxides, magnetites, and mixtures thereof. The toner colorant should be present in a sufficient amount to render the toner composition colored. Thus, the colorant particles can be present in amounts of from about 3 percent by weight to about 20 percent by weight, and preferably from about 3 to about 12 weight percent or percent by weight, based on the total weight of the toner composition, however, lesser or greater amounts of colorant particles can be selected. Colorant includes pigment, dye, mixtures thereof, mixtures of pigments, mixtures of dyes, and the like. Specific colorant examples are colored pigments, dyes, and mixtures thereof including carbon black, such as REGAL 330® carbon black (Cabot Corporation), Acetylene Black, Lamp Black, Aniline Black, Chrome Yellow, Zinc Yellow, Sicofast Yellow, Sunbrite Yellow, Luna Yellow, Novaperm Yellow, Chrome Orange, Bayplast Orange, Cadmium Red, Lithol Scarlet, Hostaperm Red, Fanal Pink, Hostaperm Pink, Lithol Red, Rhodamine Lake B, Brilliant Carmine, Heliogen Blue, Hostaperm Blue, Neopan Blue, PV Fast Blue, Cinquassi Green, Hostaperm Green, titanium dioxide, cobalt, nickel, iron powder, Sicopur 4068 FF, and iron oxides such as MAPICO Black (Columbia), NP608 and NP604 (Northern Pigment), Bayferrox 8610 (Bayer), M08699 (Mobay), TMB-100 (Magnox), mixtures thereof and the like.

The colorant, preferably black, cyan, magenta and/or yellow colorant is incorporated in an amount sufficient to impart the desired color to the toner. In general, the pigment or dye is selected in an amount of from about 2 to about 60 percent by weight, and preferably from about 2 to about 9 percent by weight for a color toner and about 3 to about 60 percent by weight for black toner.

For the cyan toner, the toner should contain a suitable cyan pigment and loading so as to enable a broad color gamut similar to that achieved in benchmark lithographic four-color presses. In embodiments, the cyan pigment is comprised of 30 percent PV FAST BLUE™ (Pigment Blue 15:3) obtained from SUN Chemicals dispersed in a 70 percent linear propoxylated bisphenol A fumarate and is loaded into the toner in an amount of about 11 percent by weight (corresponding to about 3.3 percent by weight pigment loading). For the yellow toner, the toner should contain a suitable yellow pigment type and loading so as to enable a color gamut as similar to that achieved in benchmark lithographic four-color presses. The pigment can be comprised of 30 percent Sunbrite Yellow (Pigment Yellow 17) obtained from SUN Chemicals dispersed in 70 percent of a linear propoxylated bisphenol A fumarate and is loaded into the toner in an amount of about 27 percent by weight (corresponding to about 8 percent by weight pigment loading).

For the magenta toner, the toner should contain a suitable magenta pigment type and loading to provide a broad color gamut. The magenta pigment can be comprised of 40 percent FANAL PINK™ (Pigment Red 81:2) obtained from BASF dispersed in 60 percent of a linear propoxylated bisphenol A fumarate and is loaded into the toner in an amount of about 12 percent by weight (corresponding to about 4.7 percent by weight pigment loading).

When the colorant particles are comprised of magnetites, which are a mixture of iron oxides ($FeO.Fe_2O_3$) including those commercially available as MAPICO BLACK™, they are usually present in the toner composition in an amount of from about 10 percent by weight to about 70 percent by weight, and preferably in an amount of from about 20 percent by weight to about 50 percent by weight.

The resin particles are present in a sufficient, but effective amount, thus when 10 percent by weight of pigment, or colorant, such as carbon black, is contained therein, about 90 percent by weight of resin is selected. Generally, the toner composition is comprised of from about 85 percent to about 97 percent by weight of toner resin particles, and from about 3 percent by weight to about 15 percent by weight of colorant particles.

The developer compositions can be comprised of thermoplastic resin particles, carrier particles and as colorants, magenta, cyan and/or yellow particles, and mixtures thereof. More specifically, illustrative examples of magentas include 1,9-dimethyl-substituted quinacridone and anthraquinone dye identified in the Color Index as CI 60720, CI Dispersed Red 15, a diazo dye identified in the Color Index as CI 26050, CI Solvent Red 19, and the like. Examples of cyans include copper tetra-4(octaecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy aceto-acetanilide, permanent Yellow FGL, and the like. The colorants, which include pigments, mixtures of pigments, dyes, mixtures of dyes, mixtures of dyes and pigments, and the like, are generally present in the toner composition in an amount of from about 1 weight percent to about 15 weight percent based on the weight of the toner resin particles.

For further enhancing the positive charging characteristics of the developer compositions illustrated herein, and as optional components there can be incorporated therein known charge enhancing additives inclusive of alkyl pyridinium halides, reference U.S. Pat. No. 4,298,672, the disclosure of which is totally incorporated herein by reference; organic sulfate or sulfonate compositions, reference U.S. Pat. No. 4,338,390, the disclosure of which is totally incorporated herein by reference; distearyl dimethyl ammonium sulfate; metal complexes, E-88™, naphthalene sulfonates, quaternary ammonium compounds; and other similar known charge enhancing additives. These additives, which can also include waxes, such as polypropylenes, polyethylenes, and the like, and surface additives of colloidal silicas, are usually incorporated into the toner or carrier coating in an amount of from about 0.1 to about 20 percent by weight, and preferably from about 1 to about 7 weight percent by weight.

The toner composition can be prepared by a number of known methods including melt blending the toner resin particles, and pigment particles or colorants of the present invention followed by mechanical attrition. Other methods include emulsion aggregates spray drying, melt dispersion, dispersion polymerization and suspension polymerization. In one dispersion polymerization method, a solvent dispersion of the resin particles and the colorant particles are spray dried under controlled conditions to result in the desired product.

Examples of imaging members selected for the imaging processes illustrated herein are selenium, selenium alloys, and selenium or selenium alloys containing therein additives or dopants such as halogens. Furthermore, there may be selected organic photoreceptors, illustrative examples of which include layered photoresponsive devices comprised of transport layers and photogenerating layers, reference U.S. Pat. Nos. 4,265,990; 4,585,884; 4,584,253, and 4,563,406, the disclosures of which are totally incorporated herein by reference, and other similar layered photoresponsive devices. Examples of generating layers are trigonal selenium, metal phthalocyanines, perylenes, titanyl phthalocyanines, metal free phthalocyanines and vanadyl phthalocyanines. As charge transport molecules there can be selected, for example, the aryl diamines disclosed in the '990 patent. Also, there can be selected as photogenerating pigments, squaraine compounds, thiapyrillium materials, hydroxy gallium phthalocyanine, and the like. These layered members are conventionally charged negatively thus usually requiring a positively charged toner. Other photoresponsive members may include pigments of polyvinylcarbazole 4-dimethylamino benzylidene, benzhydrazide, 2-benzylidene-aminocarbazole, 4-dimethylamino-benzylidene, (2-nitro-benzylidene)-p-bromoaniline, 2,4-diphenyl-quinazoline, 1,2,4-triazine, 1,5-diphenyl-3-methylpyrazoline 2-(4'-dimethylaminophenyl)-benzoaxzole, 3-aminocarbazole, polyvinyl carbazole-trinitrofluorenone charge transfer complex; and mixtures thereof.

Moreover, the developer compositions of the present invention are particularly useful in electrostatographic imaging processes and apparatuses wherein there is selected a moving transporting means and a moving charging means; and wherein there is selected a deflected flexible layered imaging member, reference U.S. Pat. Nos. 4,394,429 and 4,368,970, the disclosures of which are totally incorporated herein by reference. Images obtained with the developer composition of the present invention in embodiments possessed acceptable solids, excellent halftones and desirable line resolution with acceptable or substantially no background deposits.

The following Examples are being provided to further illustrate embodiments of the present invention. Parts and percentages are by weight unless otherwise indicated. In embodiments, the EEONOMER® 200F provides excellent conductivity as compared to the same amounts of carbon black alone.

| EEONOMER ® DOPED | | | CARBON BLACK DOPED | | |
|---|---|---|---|---|---|
| Carrier Conductivity | Tribo | Percent by Weight EEONOMER ® | Carrier Conductivity | Tribo | Percent by Weight Carbon Black |
| 2.36E−10 | 30.1 | 0.00 | 2.36E−10 | 30.1 | 0.00 |
| — | — | — | 4.44E−10 | 21.1 | 0.04 |
| 3.24E−08 | 20.3 | 0.04 | 6.25E−08 | 13.0 | 0.10 |
| 1.85E−07 | 15.8 | 0.08 | 1.58E−07 | 12.4 | 0.20 |

Initial testing of the EEONOMER® materials included the determination of the percolation threshpoint and comparing it to carbon clack at the same volume loading. The percolation threshpoint is the point where the materials resistivity changes as illustrated by a very steep curve and becoming relatively conductive as the amount of conductive additive is increased. The percolation threshpoint helps explain, it is believed, as to why the conductivity of a carrier that has been processed with EEONOMER® 200F permits a number of suitable characteristics as compared to a carrier processed with just carbon black.

The percolation threshpoint was determined by blending additive/polymer mixes, such as by blending the EEONO- MER® and polymethyl methacrylate at ratios where the percent by volume of EEONOMER® 200F is increased in small increments and the additive/polymer ratio is from about 3 percent to about 15 percent by volume of conductive polymer additive. The resistivities of the pellets resulting are then measured using just the ASTM test method D257-90. The EEONOMER® pressed pellets achieved a percolation at lower volume loading than pellets pressed using carbon black (Conductex SC Ultra Powder Carbon Black available from Columbian Chemicals Company, 1600 Parkwood Circle, Ga. 30339). The percent by weight of the polymethylmethacrylate was determined, and the percent by weight of the conductive additive was inferred from this measurement. The percent by volume of the conductive additive in the premix was then calculated using the true density of the materials. The point of percolation of EEONOMER® and carbon black (Conductex SC Ultra Powder Carbon Black available from Columbian Chemicals Company, 1600 Parkwood Circle, Ga. 30339), and the volume resistivity response as a function of percent volume loading of conductive additive is as illustrated in the following table.

| CONDUCTIVE ADDITIVE | PERCOLATION THRESHPOINT |
|---|---|
| EEONOMER ® 200F | 6.5 percent by vol. |
| Carbon Black | 8.7 percent by vol. |

EXAMPLE I

Preparation; Measurement of Pellet Resistivity:

To determine the volume resistivity of a pellet of 5 percent by volume EEONOMER® 200F, a mixture of EEONOMER® 200F and polymethylmethacrylate was prepared utilizing a mixing device, available from Bepex Corp., Minneapolis, Minn. (Model #NHS-0). The conductive additive/polymer premix was prepared by adding 2.75 grams of EEONOMER® 200F and 35.92 grams of polymethylmethacrylate. These components/materials were mixed in a 300 cc cup utilizing the Hybridizer propeller at 1,300 rpm for 2 minutes.

To press the pellet, the resistivity pellet die holes were filled with 0.8 cc (use the true density of the powder to calculate this) of the generated above powder mixture. Utilizing a die press capable of 7,000 PSI pressure, pumped the press until 5,000 PSI pressure ±100 PSI was applied to the die. This pressure was maintained for 5 minutes.

Rubber gloves were utilized to measure the pellets dimensions to prevent skin oils and salts from affecting the resistivity measurement of the pellets. Once the pellets were removed from the die, the edges of the pellets were gently trimmed free of any mold flanges with a razor blade using a slight scraping motion. Any pellets with large (>1 millimeter) gouges, flakes missing, or large cracks were usually discarded. Using calipers capable of measuring hundredths of a millimeter or thousandths of an inch, a measurement of the thickness and diameter of each pellet was accomplished.

Subsequently there was brushed a thin uniform about 1 to about 3 millimeter coat of silver print (Silver Print GC Electronics # 22-202) on one side of each pellet; and the silver print was permitted to dry for about 5 to about 10 minutes, then the silver print was applied to the other side of the pellet. The resulting pellets were allowed to stand as is for about 30 minutes to allow volatiles to dissipate. Using a resistivity cell in conjunction with a Keithly model 617 Programmable Electrometer the resistivity of the pellets were measured. Volume resistivity was then calculated for each pellet.

| EEONOMER ® 200F | | CARBON BLACK | |
|---|---|---|---|
| Additive (% by Vol) | Resistivity (W-cm) | Additive (% by Vol) | Resistivity (W-cm) |
| 5.8 | 4.5E+10 | 2.6 | 4.2E+11 |
| 6.5 | 5.3E+06 | 8.7 | 6.7E+06 |
| 7.3 | 9.1E+02 | 16.5 | 1.7E+02 |
| 10.1 | 9.6E+01 | 22.7 | 1.9E+01 |
| 16.0 | 8.9E+00 | | |
| 20.3 | 7.3E+00 | | |

$$\text{Volume Resistivity (ohm} - \text{cm)} = R\left(\frac{A}{t}\right)$$

where:

R=Measured Resistance in Ohms

A=The area of the circular electroded surface of the pellet in $cm^2$ t=The thickness of the pellet in cm.

EXAMPLE II

Preparation of 10/90 Ratio (by Weight) of EEONOMER®/Polymethylmethacrylate Coated Carrier:

There was prepared by mixing in a 5 liter M5R blender (available from Littleford Day Inc., Florence, Ky.) a polymer premix of 10 percent by weight of EEONOMER® 200F (available commercially from Eeonyx Inc., Pinole, Calif.), and 90 percent by weight of polymethylmethacrylate (MP-116 available commercially from Soken Chemical & Engineering Co. Ltd., Tokyo, Japan). The polymer premix product was blended in the M5R blender at 62.6 percent volume loading for 4 minutes at 400 rpm.

Subsequently, a core/polymer premix was produced by combining 544.3 grams of the above generated resulting polymer premix with 120 pounds of 90 micron volume median diameter irregular steel core (obtained from Hoeganaes), with the core size determined in this and all following carrier Examples by a standard laser diffraction technique, were mixed in a Munson style blender (Model #MX-1, obtained from Munson Machinery Company Inc., Utica, N.Y.). The mixing was accomplished at 27.5 rpm for a period of 30 minutes. There resulted uniformly distributed and electrostatically attached polymer premix on the steel core as determined by visual observation.

The resulting mixture was then processed in a seven inch i.d. rotary furnace (obtained from Harper International Inc., Lancaster N.Y.) under the conditions of 5.25 rpm, feedrate of 450 grams/minute and furnace angle of 0.65 degree. The conditions presented (rpm, feedrate and angle) are some of the primary factors that drive the residence time and volume loading which are the desired parameters for fusing the coating to the carrier core. Residence time is calculated as the quotient of the weight of the core/polymer mixture in the muffle section (heated section) of the kiln and the feedrate of the materials. The resulting residence time of the materials at the above stated setpoints was 32 minutes. The volume loading of the kiln at the above stated setpoints was 7 percent of the total volume of the kiln. The peak bed temperature of the materials under these conditions was 221° C., thereby causing the polymer to melt and fuse to the core. There resulted a continuous uniform polymer coating on the core. The carrier powder coating process used is described, for example, in U.S. Pat. Nos. 4,935,326; 5,015,550 4,937,166; 5,002,846 and 5,213,936, the disclosures of which are totally incorporated herein by reference.

The final product was comprised of a carrier core with a total of 1 percent by weight of polymer coating on the surface. The aforementioned polymer coating of poly(methyl methacrylate) and EEONOMER® 200F polymer premix illustrated herein was comprised of 10 weight percent of EEONOMER® 200F and 90 weight percent of poly(methyl methacrylate). The weight percent of this carrier was determined in this and all following carrier examples by dividing the difference between the weights of the fused carrier and the carrier core by the weight of the fused carrier.

A developer composition was then prepared by mixing 150 grams of the above prepared carrier with 4.5 grams of an 8 micron volume median diameter (volume average diameter) toner composition comprised of REGAL 330® carbon black, a partially crosslinked polyester resin with 37 percent (by weight) gel content obtained by the reactive extrusion of a linear bisphenol A propylene oxide fumarate polymer. The toner composition contained as external surface additives 2.1 percent by weight of hydrophobic 40 nanometer size titania, 2.8 percent by weight of 40 nanometer size hydrophobic silica, and 0.24 weight percent of zinc stearate. This developer was conditioned for 1 hour at 50 percent RH and 70° F. The resulting developer was shaken on a paint shaker at 715 rpm in an 8 ounce jar and a 0.45 gram sample was removed after 5 minutes. Thereafter, the triboelectric charge on the carrier particles was determined by the known Faraday Cage process, and there was measured on the carrier a negative charge of 14.5 microcoulombs per gram. Further, the conductivity of the carrier as determined by forming a 0.1 inch magnetic brush of the carrier particles, and measuring the conductivity by imposing a 10 volt potential across the brush was $6.1\times10^{-7}$ $(\text{ohm-cm})^{-1}$. Therefore, these carrier particles were conductive.

Additionally a developer composition was prepared by mixing in a 5 liter M5R blender (available from Littleford Day Inc., Florence, Ky.) 7,560 grams of the above prepared carrier with 393.1 grams of the above toner for 12.5 minutes at 200 rpm. The resulting developer was submitted for machine testing in both a Xerox Corporation DC265 and a Xerox Corporation DC490 xerographic machine to determine A(t) in three separate temperature/humidity environments; 50 percent RH at 70° F., 20 percent RH at 60° F. and 80 percent RH at 80° F.

The A(t) was calculated from the product of the measured toner concentration plus one and the measured triboelectric charge follows $$A(t)=(q/m)*(TC+1)$$

The triboelectric charge was determined with a 0.45 gram sample of machine aged developer, and the triboelectric charge on the carrier particles was measured by the known Faraday Cage process.

The calculated A(t) on the carrier in the above first two environmental zones (50 percent RH at 70° F., 20 percent RH at 60° F.) was relative to a control developer that was prepared by blending at the same ratio of carrier and toner, and the same M5R processing setpoints described above. Additionally, the control developer was machine aged in the same xerographic machines and environments indicated above. The carrier utilized to prepare this control developer was comprised of a polymer premix of 19.5 percent by weight of carbon black and 80.5 percent by weight of polymethylmethacrylate, and was processed in the same manner as indicated above. Both the 10 percent EEONOMER® and the 19.5 percent carbon black carriers utilized in these developers had relative conductivity ($10^{-7}$ ohm-cm).

The final environmental zone typically had a low A(t) (80 percent RH at 80° F.). However, the calculated A(t) of the developer generated from carrier that utilized 10 percent by weight EEONOMER® was 15 A(t) units higher than the control developer that utilized a carrier comprised of 19.5 percent by weight carbon black.

EXAMPLE III

Preparation of 8/92 Ratio (by Weight) of EEONOMER®/Polymethyl Methacrylate Coated Carrier:

There was prepared by mixing in a 10 liter Henschel blender (available from Henschel Mixers America, Inc. Model FM-10) a high intensity polymer premix of 8 percent by weight of EEONOMER® 200F (available commercially from Eeonyx Inc., Pinole, Calif.), and 90 percent by weight of polymethylmethacrylate (MP-116 available commercially from Soken Chemical & Engineering Co. Ltd., Tokyo, Japan). The polymer premix product was blended in the Henschel blender at 50 percent volume loading for 1 minute at 3,000 rpm.

A core/polymer premix composition was then prepared and fused onto the carrier of Carrier Example II. The resulting residence time was 32.3 minutes The volume loading of the kiln was 6.96 percent of the total volume of the kiln. The peak bed temperature of the materials under these conditions was 223° C., thereby causing the polymer to melt and fuse to the core. This resulted in a continuous uniform polymer coating on the core.

The final product was comprised of a carrier core with a total of 1 percent by weight of polymer coating on the surface. The polymer coating of poly(methyl methacrylate) with EEONOMER® 200F and carbon black contained 8 weight percent of EEONOMER® 200F and 92 weight percent of poly(methyl methacrylate).

A developer composition was then prepared as described in Carrier Example II. Thereafter, the triboelectric charge on the carrier particles was determined by the known Faraday Cage process, and there was measured on the carrier a negative charge of 15.7 μC per gram. Further, the conductivity of the carrier as determined by forming a 0.1 inch magnetic brush of the carrier particles, and measuring the conductivity by imposing a 10 volt potential across the brush was $2.09\times10^{-7}$ $(\text{ohm-cm})^{-1}$.

EXAMPLE IV

Preparation of 12/88 Ratio (by Weight) of EEONOMER®/Polymethylmethacrylate Coated Carrier:

There was prepared by mixing in a 10 liter Henschel blender (available from Make Henschel Mixers America, Inc. Model FM-10) a high intensity polymer premix of carbon black and 12 percent by weight of EEONOMER® 200F (available commercially from Eeonyx Inc., Pinole, Calif.), and 88 percent by weight polymethylmethacrylate (MP-116 available commercially from Soken Chemical & Engineering Co. Ltd., Tokyo, Japan). The polymer premix product was blended in the Henschel blender at 57 percent volume loading for 1 minute at 3,000 rpm.

A core/polymer premix composition was then prepared and fused into carrier as described in Carrier Example II, resulting in the same residence time and volume loading of the kiln. The peak bed temperature of the materials under these conditions was 222° C., thereby causing the polymer to melt and fuse to the core. This resulted in a continuous uniform polymer coating on the core.

The final product was comprised of a carrier core with a total of 1 percent by weight of polymer coating on the surface. The polymer coating of poly(methyl methacrylate) with EEONOMER® 200F contained 12 weight percent of EEONOMER® 200F and 88 weight percent of poly(methyl methacrylate).

A developer composition was then prepared as described in Carrier Example II. Thereafter, the triboelectric charge on the carrier particles was determined by the known Faraday Cage process, and there was measured on the carrier a negative charge of 13.7 μC per gram. Further, the conductivity of the carrier as determined by forming a 0.1 inch magnetic brush of the carrier particles, and measuring the conductivity by imposing a 10 volt potential across the brush was $1.04\times10^{-6}$ (ohm-cm)$^{-1}$. Therefore, these carrier particles were conductive.

EXAMPLE V

Preparation of 20/80 Ratio (by Weight) of EEONOMER®/ Polymethylmethacrylate Coated Carrier:

There was prepared by mixing in a 2 quart jar on a roll mill apparatus a polymer premix of 20 percent by weight of EEONOMER® 200F (available commercially from Eeonyx Inc., Pinole, Calif.), and 80 percent by weight polymethylmethacrylate (MP-116 available commercially from Soken Chemical & Engineering Co. Ltd., Tokyo, Japan). The polymer premix product was blended on the roll mill at 54.7 percent volume loading of the poly(methyl methacrylate) and EEONOMER® 200F input materials for 30 minutes at 90 feet per minute with 900 grams of 0.5 centimeter steel balls.

Thereafter, the carrier coating core/polymer premix was generated by combining 54.4 grams of the above resulting polymer premix containing carbon black with 10 pounds of 80 micron volume median diameter irregular steel core (obtained from Hoganaes), and mixed in a 5 liter M5R blender (available from Littleford Day Inc., Florence, Ky.). The mixing was accomplished at 220 rpm for a period of 10 minutes. There resulted uniformly distributed and electrostatically attached polymer premix on the core as determined by visual observation.

The core/polymer premix was then processed in a three inch i.d. rotary furnace (obtained from Harper International Inc., Lancaster, N.Y.) under the conditions of 7 rpm, feedrate of 30 grams/minute, and furnace angle of 0.65 degree. The resulting residence time of the materials at the above stated setpoints was 24 minutes. The volume loading of the kiln at the above stated setpoints was 5.5 percent of the total volume of the kiln. The peak bed temperature of the materials under these conditions was 213° C., thereby causing the polymer to melt and fuse to the core. This resulted in a continuous uniform polymer coating on the core.

The final product was comprised of a carrier core with a total of 1.2 percent by weight of polymer coating on the surface. The polymer coating of poly(methyl methacrylate) and EEONOMER® 200F polymer premix was comprised of 20 weight percent EEONOMER® 200F and 80 weight percent of polymethyl methacrylate.

A developer composition was then prepared as described in Carrier Example II. Thereafter, the triboelectric charge on the carrier particles was determined by the known Faraday Cage process, and there was measured on the carrier a negative charge of 10.8 μC per gram. Further, the conductivity of the carrier as determined by forming a 0.1 inch magnetic brush of the carrier particles, and measuring the conductivity by imposing a 10 volt potential across the brush was $1.03\times10^{-5}$ (ohm-cm)$^{-1}$. Therefore, these carrier particles were conductive.

In addition to the above developer bench characterization, the following developer composition was prepared by mixing 100 grams of the above prepared carrier with 4.5 grams of an about 7 to about 8 micron volume median diameter (volume average diameter) toner composition comprised of a partially crosslinked polyester resin with 7 percent (by weight) gel content, obtained by the reactive extrusion of a linear bisphenol A propylene oxide fumarate polymer. The toner composition contained as external surface additives 2.5 percent by weight of hydrophobic 40 nanometer size titania, 3.5 percent by weight of 40 nanometer size hydrophobic silica, and 0.3 weight percent of zinc stearate. This developer was conditioned for 1 hour at 50 percent RH and 70° F. The resulting developer was shaken on a paint shaker at 715 rpm in an 4 ounce jar, and a 0.3 gram sample was tested for its triboelectric charge. Thereafter, the triboelectric charge on the carrier particles was determined by the known Faraday Cage process, and there was measured on the carrier a negative charge of 25.1 μC per gram.

EXAMPLE VI

Preparation of 5/95 Ratio (by Weight) of EEONOMER®/ Polymethylmethacrylate Coated Carrier:

There was prepared by mixing in a 2 quart jar on a roll mill apparatus the polymer premix illustrated herein of 5 percent by weight of EEONOMER® 200F (available commercially from Eeonyx Inc., Pinole, Calif.), and 95 percent by weight of polymethylmethacrylate (MP-116 available commercially from Soken Chemical & Engineering Co. Ltd., Tokyo, Japan). The polymer premix product was blended on the roll mill at 34.6 percent volume loading of the poly(methylmethacrylate) and EEONOMER® 200F input materials for 30 minutes at 90 feet per minute with 900 grams of 0.5 centimeter steel balls.

The core/polymer premix was obtained by combining 36.3 grams of the resulting polymer premix with 10 pounds of 80 micron volume median diameter irregular steel core (obtained from Hoganaes), and mixing in the same mixing manner as in Example V. There resulted uniformly distributed and electrostatically attached polymer premix on the core as determined by visual observation.

The core/polymer mix was then fused into carrier as described in Carrier Example V, resulting in the same residence time and volume loading of the kiln as in Example V. The peak bed temperature of the materials under these conditions was 203° C., thereby causing the polymer to melt and fuse to the core. This resulted in a continuous uniform polymer coating on the core.

The final product was comprised of a carrier core with a total of 0.8 percent by weight of polymer coating on the surface. The polymer coating of poly(methyl methacrylate) and EEONOMER® 200F polymer premix was comprised of 5 weight percent of EEONOMER® 200F and 95 weight percent of poly(methyl methacrylate).

A developer composition was then prepared as described in Carrier Example II. Thereafter, the triboelectric charge on the carrier particles was determined by the known Faraday Cage process, and there was measured on the carrier a negative charge of 20.3 μC per gram. Further, the conductivity of the carrier as determined by forming a 0.1 inch magnetic brush of the carrier particles, and measuring the conductivity by imposing a 10 volt potential across the brush was $3.24\times10^{-8}$ $(\text{ohm-cm})^{-1}$. Therefore, these carrier particles were conductive.

In addition to the above developer bench characterization, the following developer composition was prepared by mixing 100 grams of the above prepared carrier with 4.5 grams of a 7.5 micron volume median diameter (volume average diameter) toner composition comprised of a partially crosslinked polyester resin with 7 percent (by weight) gel content, obtained by the reactive extrusion of a linear bisphenol A propylene oxide fumarate polymer. The toner composition contained as external surface additives 2.5 percent by weight of hydrophobic 40 nanometer size titania, 3.5 percent by weight of 40 nanometer size hydrophobic silica, and 0.3 weight percent of zinc stearate. This developer was conditioned for 1 hour at 50 percent RH and 70° F. The resulting developer was shaken on a paint shaker at 715 rpm in a 4 ounce jar and a 0.3 gram sample was tested for its triboelectric characteristics. Thereafter, the triboelectric charge on the carrier particles was determined by the known Faraday Cage process, and there was measured on the carrier a negative charge of 37.4 μC per gram.

EXAMPLE VII

Preparation of 10/90 Ratio (by Weight) of EEONOMER®/Polymethylmethacrylate Coated Carrier:

There was prepared by mixing in a 130 liter 130D blender (available from Littleford Day Inc., Florence, Ky.) a polymer premix of 10 percent by weight of EEONOMER® 200F (available commercially from Eeonyx Inc., Pinole, Calif.), and 90 percent by weight of polymethylmethacrylate (MP-116 available commercially from Soken Chemical & Engineering Co. Ltd., Tokyo, Japan). The polymer premix product was blended in the above 130D blender at 32.8 percent volume loading for 6 minutes at a plow speed of 156 rpm and a chopper speed of 2,600 rpm.

The core/polymer premix was produced by combining 7,402.6 grams of the resulting polymer premix with 1,632 pounds of 90 micron volume median diameter irregular steel core (obtained from Hoeganaes) and mixing in a Munson style blender (Model #700-THX-15-SS, obtained from Munson Machinery Company Inc., Utica, N.Y.). The mixing was accomplished at 9 rpm for a period of 30 minutes. There resulted uniformly distributed and electrostatically attached polymer premix on the core as determined by visual observation.

The mixture resulting was then processed in a sixteen inch i.d. rotary furnace (obtained from Harper International Inc., Lancaster, N.Y. Model #NOU-16D165-RTA-WC-10) under the conditions of 6 rpm, feedrate of 1,000 pounds per hour and furnace angle of 0.9 degree. The resulting residence time of the materials at the above stated setpoints was 25.3 minutes. The volume loading of the kiln at the above stated setpoints was 8.69 percent of the total volume of the kiln. The peak bed temperature of the materials under these conditions was 221° C., thereby causing the polymer to melt and fuse to the core. This resulted in a continuous uniform polymer coating on the core.

The final product was comprised of a carrier core with a total of 1 percent by weight of polymer coating on the surface. The polymer coating of poly(methylmethacrylate) and EEONOMER® 200F polymer premix was comprised of 10 weight percent of EEONOMER® 200F and 90 weight percent of poly(methylmethacrylate).

A developer composition was then prepared as described in Carrier Example II. Thereafter, the triboelectric charge on the carrier particles was determined by the known Faraday Cage process, and there was measured on the carrier a negative charge of 15.2 μC per gram. Further, the conductivity of the carrier as determined by forming a 0.1 inch magnetic brush of the carrier particles, and measuring the conductivity by imposing a 10 volt potential across the brush was $5.28\times10^{-7}$ $(\text{ohm-cm})^{-1}$. Therefore, these carrier particles were conductive.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. Carrier comprised of a core and a polymer coating, wherein said coating contains a conductive polymer contained in a carbon black matrix, wherein said conductive polymer is formed by the in situ polymerization of said conductive polymer onto said carbon black matrix, wherein said conductive polymer is selected from the group consisting of polypyrrole and polyaniline;

and wherein said conductive polymer is present in an amount of about 0.1 percent by weight of said polymer coating.

2. A carrier in accordance with claim 1 wherein the polymer coating is comprised of a mixture of polymers.

3. A carrier in accordance with claim 2 wherein the mixture is comprised of two polymers.

4. A carrier in accordance with claim 2 wherein the mixture is comprised of two polymers not in close proximity in the triboelectric series.

5. A carrier in accordance with claim 2 wherein the mixture is comprised of from about 2 polymers to about 7 polymers.

6. A carrier in accordance with claim 2 with a conductivity of from about $10^{-15}$ to about $10^{-4}$ $(\text{ohm-cm})^{-1}$.

7. A carrier in accordance with claim 2 with a triboelectric charge value of from about −60 to about 60 microcoulombs/gram and a conductivity of from about $10^{-12}$ to about $10^{-6}$ $(\text{ohm-cm})^{-1}$.

8. A carrier in accordance with claim 1 wherein the conductive polymer is a polypyrrole coated on carbon black.

9. A carrier in accordance with claim 8 wherein the polymer possesses a weight average molecular weight $M_w$ of from about 10,000 to about 400,000, or possesses a weight average molecular weight of from about 20,000 to about 100,000.

10. A carrier in accordance with claim 8 wherein said polymer possesses an $M_w$ of from about 22,000 to about 75,000, and an $M_w/M_n$ ratio of from about 1.4 to about 2.

11. A carrier in accordance with claim 1 wherein said core diameter is from about 30 to about 100 microns.

12. A carrier in accordance with claim 1 wherein said core is iron, steel or a ferrite.

13. A carrier in accordance with claim 1 wherein said coating comprises a styrene polymer.

14. A carrier in accordance with claim 1 wherein said polymer coating comprises polyvinylidenefluoride, polyethylene, polymethyl methacrylate, polytrifluoroethylmethacrylate, copolyethylene vinylacetate, copolyvinylidenefluoride, polytetrafluoroethylene, polystyrene, polyvinyl chloride, polyvinyl acetate, or mixtures thereof.

15. A carrier in accordance with claim 1 wherein said polymer coating comprises polymethylmethacrylate, polystyrene, polytrifluoroethyl methacrylate, or mixtures thereof.

16. A carrier in accordance with claim 1 wherein said polymer coating is comprised of a mixture of polymethylmethacrylate and polytrifluoroethyl methacrylate.

17. A carrier in accordance with claim 1 wherein said polymer coating is present in an amount of from about 0.5 to about 10 percent by weight of said carrier, or from about 1 to about 5 percent by weight of said carrier.

18. A developer comprised of the carrier of claim 1 and toner.

19. A developer in accordance with claim 18 wherein said toner is comprised of a thermoplastic resin, colorant, and optionally toner additives, and optionally wherein said additives are charge additives, wax, surface additives and mixtures thereof.

20. A carrier in accordance with claim 1 wherein the conductive polymer is polyaniline and the polyaniline is attached to Lignin.

21. A carrier in accordance with claim 1 wherein said coating contains a mixture of said polypyrrole and said polyaniline.

22. Carrier comprised of a core, a polymer coating, and wherein said coating contains a mixture of a polypyrrole and carbon black particles, and wherein said mixture is formed by the in situ polymerization of said pyrrole on the surface of said carbon black particles, and wherein said polypyrrole is present in an amount of about 0.1 percent by weight of said polymer coating.

23. Carrier comprised of a core, a polymer coating, and wherein said coating contains a mixture of a polyaniline and carbon black particles, and wherein said mixture is formed by the in situ polymerization of said polyaniline on the surface of said carbon black particles, and wherein said polyaniline is present in an amount of about 0.1 percent by weight of said polymer coating.

24. Carrier consisting essentially of a core and a polymer coating, and wherein said coating contains a conductive polymer contained in a carbon black matrix; and a polyaniline contained in a carbon black matrix, and wherein said conductive polymer is formed by the in situ polymerization of a polypyrrole onto said carbon black surface matrix, and wherein said polyaniline is formed by the in situ polymerization of said polyaniline onto said carbon black surface matrix, and wherein said polypyrrole is present in an amount of about 0.1 percent by weight of said polymer coating, and wherein said polyaniline is present in an amount of about 0.1 percent by weight of said polymer coating.

25. Carrier comprised of a core and a polymer coating, wherein said polymer coating contains a conductive polymer contained in a carbon black matrix;

wherein said conductive polymer is formed by the in situ polymerization of said conductive polymer onto said carbon black surface matrix;

wherein said conductive polymer has a weight average molecular weight Mw of from about 10,000 to about 400,000 or from about 20,000 to about 100,000;

wherein said conductive polymer is present in an amount of about 0.1 percent by weight of said polymer coating; and wherein said conductive polymer is selected from the group consisting of polyaniline and polypyrrole.

* * * * *